United States Patent
Jamadagni et al.

(10) Patent No.: US 9,693,381 B2
(45) Date of Patent: Jun. 27, 2017

(54) METHOD AND SYSTEM FOR PROVIDING SIMULTANEOUS CONNECTIVITY BETWEEN MULTIPLE E-NODEBS AND USER EQUIPMENT

(71) Applicant: Samsung Electronics Co., Ltd., Suwon-si, Gyeonggi-do (KR)

(72) Inventors: Satish Nanjunda Swamy Jamadagni, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/188,274

(22) Filed: Feb. 24, 2014

(65) Prior Publication Data

US 2014/0241317 A1    Aug. 28, 2014

(30) Foreign Application Priority Data

Feb. 22, 2013  (IN) .............................. 796/CHE/2013
Nov. 8, 2013  (IN) ............................. 5047/CHE/2013

(51) Int. Cl.
*H04W 76/02* (2009.01)
*H04L 5/00* (2006.01)
(Continued)

(52) U.S. Cl.
CPC ......... *H04W 76/025* (2013.01); *H04L 5/0032* (2013.01); *H04W 36/28* (2013.01); *H04W 40/36* (2013.01)

(58) Field of Classification Search
None
See application file for complete search history.

(56) References Cited

U.S. PATENT DOCUMENTS

2009/0061878 A1* 3/2009 Fischer .................. G08C 17/02
455/436
2009/0086677 A1* 4/2009 Ho ........................ H04W 36/02
370/331

(Continued)

FOREIGN PATENT DOCUMENTS

WO     2011100492 A1    8/2011
WO   WO 2011/125278    * 10/2011
(Continued)

OTHER PUBLICATIONS

3GPP TS 36.300 V11.4.0,3GPP; TSGRAN; Evolved Universal Terrestrial Radio Access (E-UTRA) and Evolved Universal Terrestrial Radio Access network (E-UTRAN); Overall description; Stage 2 (Release 11), Jan. 3, 2013.

*Primary Examiner* — Brian Roberts
(74) *Attorney, Agent, or Firm* — Jefferson IP Law, LLP

(57) ABSTRACT

A method and a system for providing simultaneous transmission and reception across multiple evolved NodeBs (eNBs) from a User Equipment (UE) in a Long Term Evolution (LTE) network are provided. The method includes establishing a first connection between the UE and a core network through a Serving-eNB (S-eNB), considering at least one Target-eNB (T-eNB) for at least one connection between the UE and a Packet Data Network (PDN), determining availability of the T-eNB, wherein the determining of the availability of the at least one T-eNB is triggered based on available resource in the S-eNB and the T-eNB, and establishing at least one connection between the UE and the PDN through one or more T-eNBs, at least one Serving-GateWay (S-GW), and at least one PDN gateway.

8 Claims, 10 Drawing Sheets

(51) Int. Cl.
*H04W 40/36* (2009.01)
*H04W 36/28* (2009.01)

(56) References Cited

U.S. PATENT DOCUMENTS

| | | | |
|---|---|---|---|
| 2010/0067484 A1* | 3/2010 | Kagimoto | H04W 4/20 370/331 |
| 2010/0067604 A1* | 3/2010 | Bhadra | H04B 7/024 375/267 |
| 2010/0098023 A1* | 4/2010 | Aghili | H04W 36/0022 370/331 |
| 2010/0208658 A1* | 8/2010 | Vesterinen | H04W 8/082 370/328 |
| 2010/0303039 A1* | 12/2010 | Zhang et al. | 370/331 |
| 2011/0021199 A1* | 1/2011 | Hapsari | H04W 4/20 455/440 |
| 2011/0080890 A1* | 4/2011 | Cai et al. | 370/331 |
| 2011/0080891 A1* | 4/2011 | Cai | H04W 36/0033 370/331 |
| 2011/0103277 A1* | 5/2011 | Watfa et al. | 370/310 |
| 2011/0116478 A1* | 5/2011 | Zhang | H04W 36/0055 370/331 |
| 2011/0250894 A1* | 10/2011 | Kunugi et al. | 455/440 |
| 2011/0268007 A1* | 11/2011 | Barany | H04B 7/024 370/312 |
| 2011/0269465 A1* | 11/2011 | Xu et al. | 455/436 |
| 2011/0294509 A1* | 12/2011 | Kim | H04W 36/38 455/436 |
| 2012/0014357 A1* | 1/2012 | Jung et al. | 370/332 |
| 2012/0021749 A1 | 1/2012 | Qiu et al. | |
| 2012/0183141 A1* | 7/2012 | Hapsari et al. | 380/272 |
| 2013/0010702 A1* | 1/2013 | Aminaka | 370/328 |
| 2013/0021929 A1* | 1/2013 | Kim | 370/252 |
| 2013/0039343 A1 | 2/2013 | Hori et al. | |
| 2013/0044730 A1 | 2/2013 | Qian et al. | |
| 2013/0114524 A1* | 5/2013 | Sirotkin et al. | 370/329 |
| 2013/0176988 A1* | 7/2013 | Wang et al. | 370/331 |
| 2014/0003357 A1* | 1/2014 | Ejzak et al. | 370/329 |
| 2014/0080484 A1* | 3/2014 | Centonza | H04W 76/045 455/436 |
| 2014/0092866 A1* | 4/2014 | Teyeb | H04W 76/045 370/331 |

FOREIGN PATENT DOCUMENTS

| | | |
|---|---|---|
| WO | 2013-009892 A1 | 1/2013 |
| WO | 2013010005 A1 | 1/2013 |

* cited by examiner

METHOD AND SYSTEM FOR PROVIDING SIMULTANEOUS CONNECTIVITY BETWEEN MULTIPLE E-NODEBS AND USER EQUIPMENT

CROSS-REFERENCE TO RELATED APPLICATION(S)

This application claims the benefit under 35 U.S.C. §119(a) of an Indian provisional patent application filed on Feb. 22, 2013 in the Indian Patent Office and assigned Serial number 796/CHE/2013, an Indian provisional patent application filed on Nov. 8, 2013 in the Indian Patent Office and assigned Serial number 5047/CHE/2013, and an Indian complete patent application filed on Feb. 6, 2014 in the Indian Patent Office and assigned Serial number 796/CHE/2013, the entire disclosure of each of which is hereby incorporated by reference.

TECHNICAL FIELD

The present disclosure relates to wireless communications. More particularly, the present disclosure relates to a method for providing simultaneous transmission and reception across multiple evolved NodeBs (eNBs) from a User Equipment (UE).

BACKGROUND

Small cells using low power nodes are considered promising to cope with rapid mobile traffic increase, especially for hotspot deployments in indoor and outdoor scenarios. A low-power node refers to a node whose transmission (Tx) power is lower than macro node and BS classes. A small cell has a range of 10 meters to 1 or 2 kilometers whereas the macrocell may have a range of a few tens of kilometers. Small cells encompass femtocells, picocells, and microcells. Small cell enhancements for an Evolved-Universal Terrestrial Radio Access (E-UTRA) and an Evolved-Universal Terrestrial Radio Access Network (E-UTRAN) focus on additional functionalities for enhanced performance in hotspot areas for indoor and outdoor using low power nodes.

The 3$^{rd}$ Generation Partnership Project (3GPP) discusses Small cell enhancements and is expected to address the deployment scenario in which different frequency bands are separately assigned to macro layer and small cell layer, respectively. Small cells are an integral part of Long Term Evolution (LTE) networks. In 3G networks, small cells are viewed as an offload technique.

Small cell enhancement is expected to support significantly increased user throughput for both downlink and uplink with main focus on typical user throughput given a reasonable system complexity. In addition, small cell enhancement is expected to target the capacity per unit area (e.g., bps/km2) to be as high as possible, for a given user and small cell distribution, typical traffic types and considering a reasonable system complexity. The small cell enhancements study is also expected to evaluate the impact of the actual backhaul delays and provide solutions with the aim of improved system performance. Other aspects, for example service quality of Voice-over-LTE (VoLTE) (e.g., a Mean Opinion Score (MOS), and the like) and delay/jitter impacts on services (i.e., video streaming, video calls, and the like), could also be addressed in follow-on studies.

When there is a large deployment of overlapping small and macro cells, there is a potential to enhance the overall throughput as experienced by the UE with the possibility of the UE associating itself with two or more cells for possible simultaneous reception/transmission of data streams.

Currently in the cellular network behavior, if there is an additional eNB connection request and when there is already an existing connection from another eNB, the core network considers this as a "Cloned SIM" or the UE lost connection in the previous eNB.

In order to allow for dual connectivity between eNBs, a need exists for a method and a system for initiating and establishing dual connectivity for simultaneous data transmission and reception for a UE via two or more eNBs establishing one or more Evolved Packet System (EPS) bearers per eNB simultaneously.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a system for providing simultaneous transmission and reception across multiple evolved NodeBs (eNBs) from a User Equipment (UE) in a Long Term Evolution (LTE) network.

In accordance with an aspect of the present disclosure, a method for providing simultaneous connectivity between multiple eNBs and a UE is provided. The method includes establishing a first connection between the UE and a core network through a Serving-eNB (S-eNB), considering at least one Target-eNB (T-eNB) for one or more connections between the UE and a Packet Data Network (PDN), determining availability of the at least one T-eNB, wherein the determining of the availability of the at least one T-eNB is triggered based on an available resource in the S-eNB and T-eNB, and establishing at least one connection between the UE and the PDN through one or more T-eNBs, at least one Serving-GateWay (S-GW), and at least one packet data network (PDN) gateway.

In accordance with another aspect of the present disclosure, a method for providing simultaneous connectivity between multiple evolved-NodeBs (eNBs) and a UE is provided. The method includes establishing a first connection between the UE and a core network through a Serving-evolved NodeB (S-eNB), sending a measurement report request message to the UE, providing the measurement report to the S-eNB, sending a service request message to a Mobility Management Entity (MME) through the serving evolved NodeB, and establishing dual connectivity between the UE and a PDN through at least one Target NodeB (T-eNB), at least one Serving-GateWay (S-GW), and at least one PDN gateway.

In accordance with another aspect of the present disclosure, a system for providing simultaneous connectivity between multiple evolved-NodeBs (eNBs) and a UE is provided. The system includes one or more Target-NodeB (T-eNB), at least one Serving-GateWay (S-GW), and at least one PDN gateway configured to establish at least one connection between the UE and a PDN.

In accordance with another aspect of the present disclosure, a system for providing simultaneous connectivity between multiple evolved-NodeBs (eNBs) and a UE is provided. The system includes a Serving-evolved NodeB (S-eNB) configured to enable dual connectivity by including a Target evolved NodeB (T-eNB) related information when sending a service request message to a Mobility Management Entity (MME) through the S-eNB, wherein the T-eNB, at least one Serving-GateWay (S-GW), and at least one PDN gateway are configured to establish dual connectivity between the UE and a PDN.

In accordance with another aspect of the present disclosure, a system for providing simultaneous connectivity between multiple evolved-NodeBs (eNBs) and a UE is provided. The system includes a Serving-evolved NodeB (S-eNB) configured to enable dual connectivity by obtaining a Target-evolved NodeB (T-eNB) over X2 interface and including the obtained T-eNB related information when sending an S1-AP message to a Mobility Management Entity (MME), wherein the T-eNB, at least one Serving-GateWay (S-GW), and at least one PDN gateway are configured to establish dual connectivity between the UE and a PDN.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
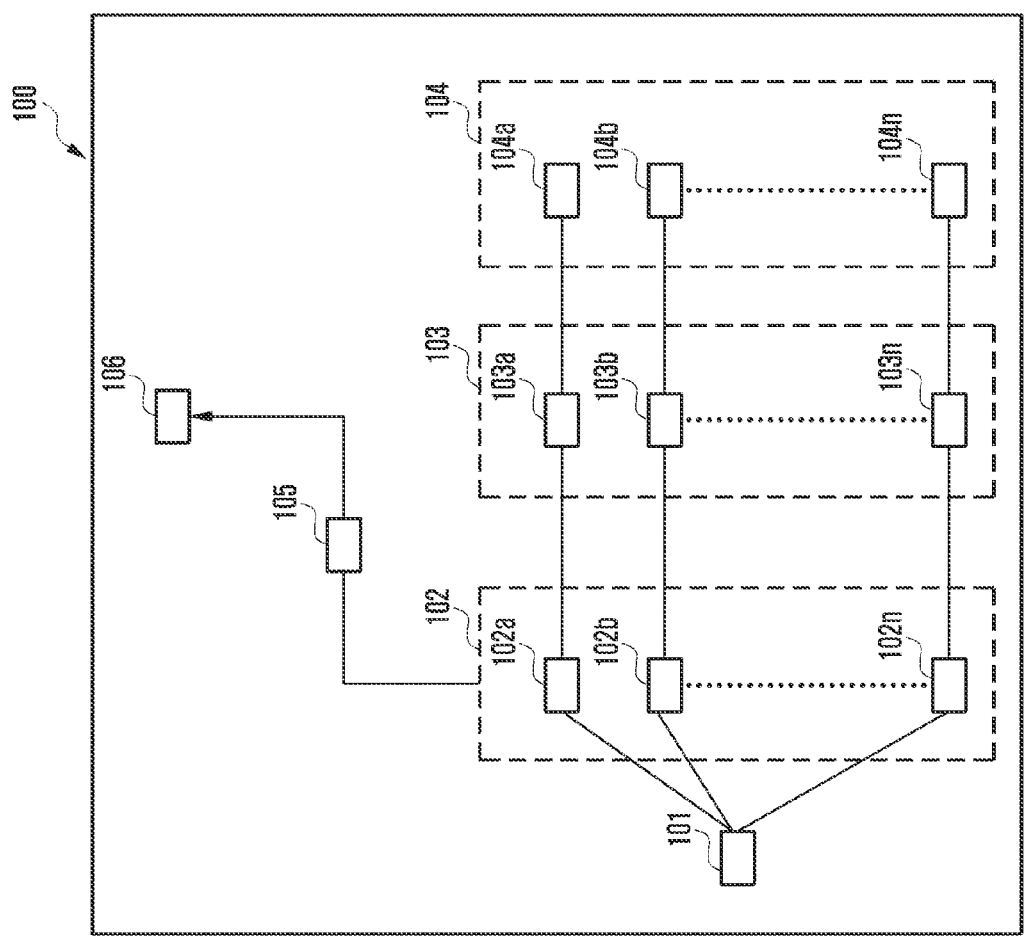
FIG. 1 illustrates a system for providing simultaneous connectivity between multiple evolved-NodeBs (eNBs) and a User Equipment (UE) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Embodiments of the present disclosure will be described with reference to the accompanying drawings. However, the present disclosure is not limited thereto. The present disclosure can be modified in various forms. Thus, the embodiments of the present disclosure are provided to more clearly explain the present disclosure to the ordinarily skilled in the art of the present disclosure. In the accompanying drawings, like reference numerals are used to indicate like components.

The specification may refer to "an", "one" or "some" embodiment(s) in several locations. This does not necessarily imply that each such reference is to the same embodiment(s), or that the feature applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure provides a method and a system for enabling simultaneous transmission and reception across multiple evolved NodeBs (eNBs) from a User Equipment (UE) in a Long Term Evolution (LTE) network. The present disclosure takes advantage of the availability of overlapping eNBs coverage area to get better gains from spectral efficiency. As long as the UE can achieve connectivity of two different eNBs, better load balancing and offloading opportunities can be leveraged. The method includes deciding to add another eNB (i.e., a Target-eNB (T-eNB)) to the UE based on the radio resource availability. Further, the method includes sending an offloading request to a Mobility Management Entity (MME) by a Serving-eNB (S-eNB) to initiate path switching of the user plane bearer/tunnel through the T-eNB. Furthermore, the method includes receiving an offloading command from the MME by the eNB-1.

In an embodiment of the present disclosure, additionally, the method includes combining the HO command from the MME and the T-eNB by the S-eNB and sending it to the UE, so that the E-UTRAN Radio Access Bearer (E-RAB) is established between the UE, T-eNB and the Serving Gateway (S-GW). Moreover, the UE derives the cryptographically unique keys for the T-eNB based on the handover command and establishes a connection with the T-eNB.

FIG. 1 illustrates a system for providing simultaneous connectivity between multiple eNBs and a UE according to an embodiment of the present disclosure.

Referring to FIG. 1, the system 100 comprises one or more UEs (101), one or more eNBs (102) comprising eNBs 102a, 102b, . . . 102n, one or more S-GWs (103) comprising S-GWs 103a, 103b, . . . 103n, one or more Packet Data Networks (PDNs) (104) comprising PDNs 104a, 104b, . . . 104n. The system 100 further comprises at least one Mobility Management Entity (MME) (105) and a Home Subscriber Server (HSS) (106). The eNB 102 is further classified as a Serving, a master, or a primary evolved NodeB (S-eNB) and a Target, a slave, or a secondary evolved NodeB (T-eNB). The system 100 establishes one or more connections between the UE 101 and a PDN through one or more T-eNB, one or more S-GWs, and one or more PDN gateways.

In another embodiment of the present disclosure, the system 100 is configured for establishing dual connectivity between the UE (101) and a PDN (104) through one or more eNB (102), one or more S-GWs (103), and one or more PDN gateways (104).

Figure 2A:
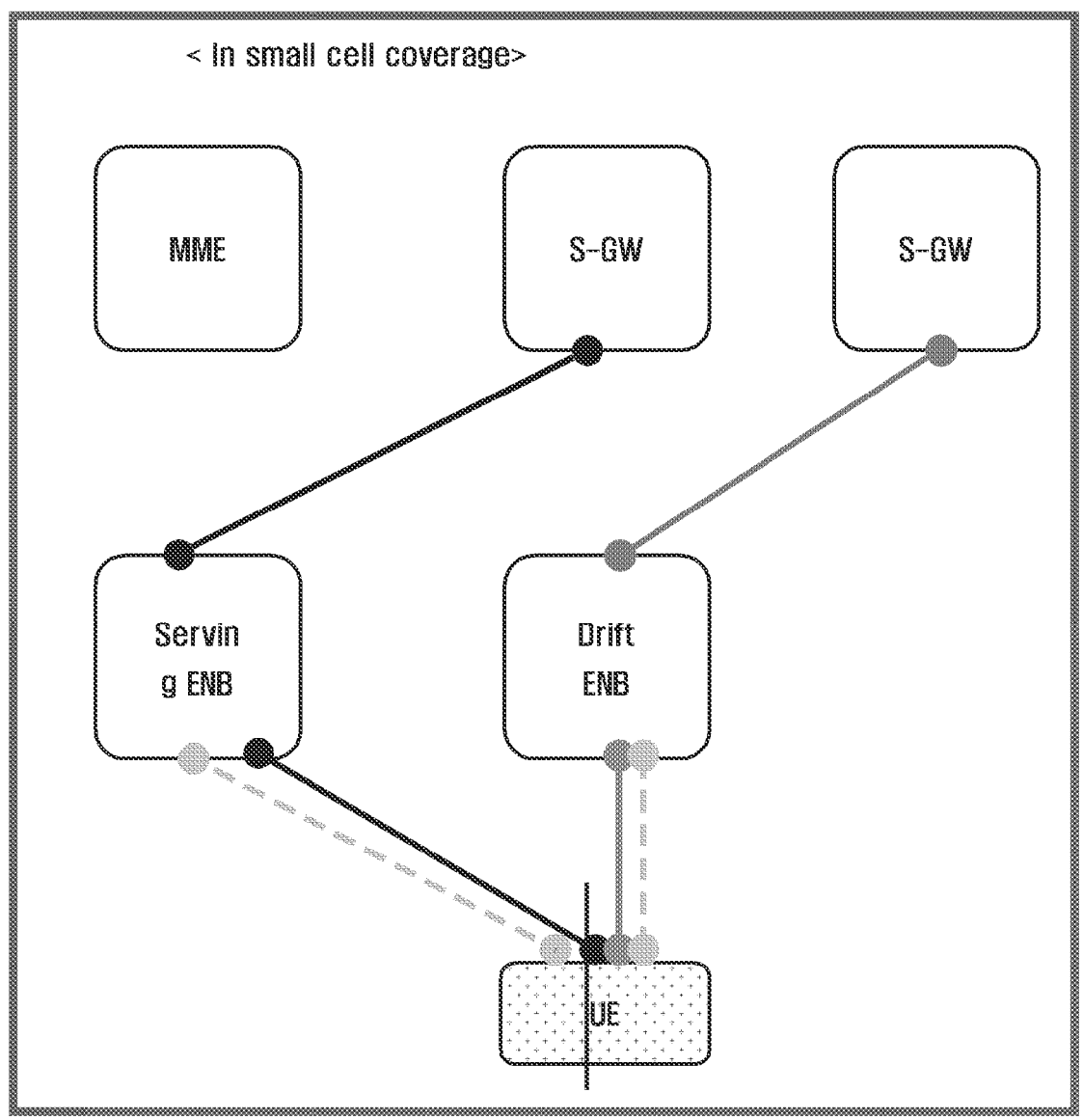
FIG. 2A illustrates a high level block diagram of a Long Term Evolution (LTE) system, wherein two eNBs are configured to serve a single UE, according to an embodiment of the present disclosure.
Figure 2B:
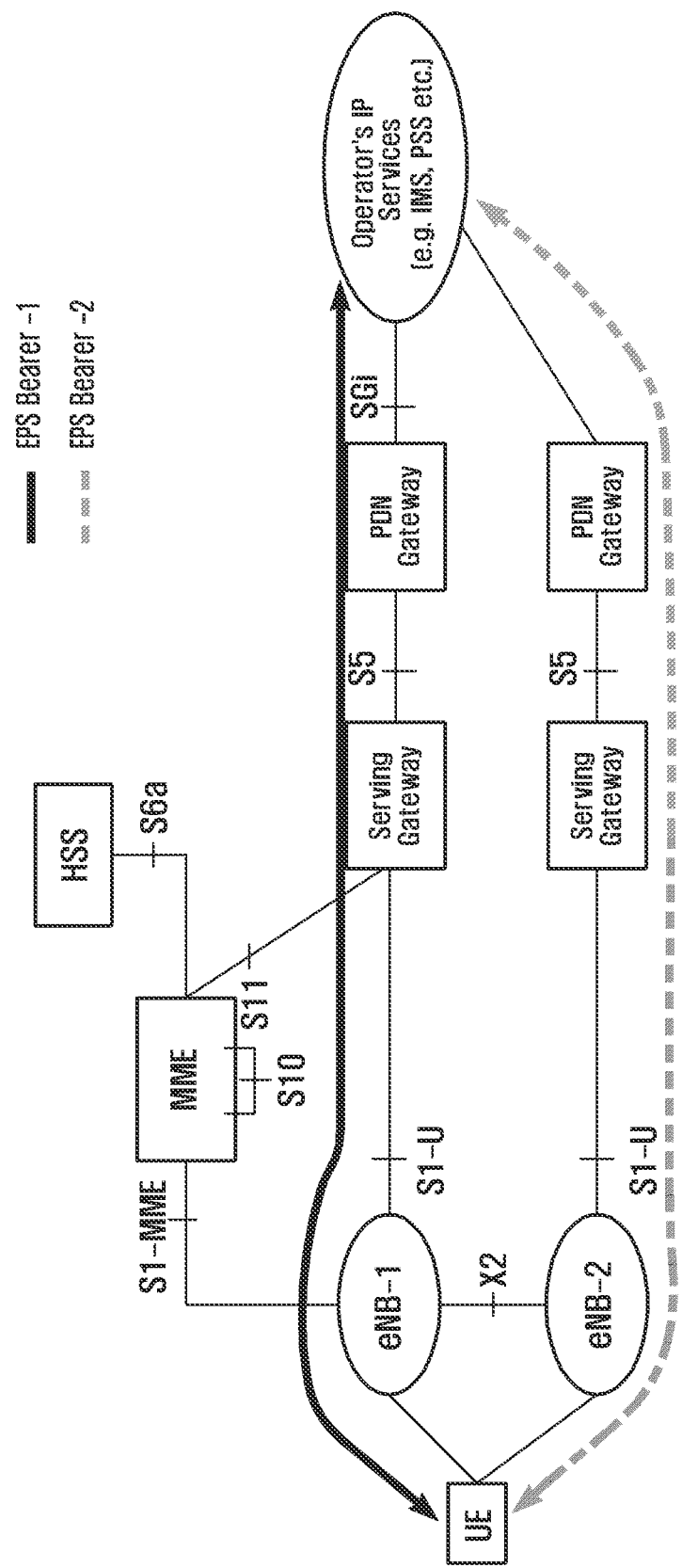
FIG. 2B illustrates a block diagram illustrating an LTE system capable of providing simultaneous transmission and reception between multiple eNBs and the UE according to an embodiment of the present disclosure.

FIG. 2A illustrates a high level block diagram of a Long Term Evolution (LTE) system, wherein two eNBs are configured to serve a single UE, according to an embodiment of the present disclosure. FIG. 2B illustrates a block diagram illustrating an LTE system capable of providing simultaneous transmission and reception between multiple eNBs and the UE, according to an embodiment of the present disclosure.

Referring to FIGS. 2A and 2B, the UE sends measurement reports to a first eNB (eNB-1). Based on the measurement reports and/or Radio Resource management process, the eNB-1 performs cell offloading assessment to determine whether to add another eNB. If the eNB-1 decides to add another eNB (hereinafter eNB-2), the eNB-1 prepares the eNB-2, obtains parameters from T-eNB and sends an offloading request to a Mobility Management Entity (MME) including the obtained parameters from T-eNB. The offloading request indicates that a new Evolved Packet System (EPS) (E-RAB) bearer on the eNB-2 is an additional eNB that will be serving the UE along with the current serving eNB-1. The above embodiment of the present disclosure is applied for the scenario, where the eNB-2 (T-eNB) and the MME does not have S1-MME interface between them and also the UE and the eNB-2 (T-eNB) does not have RRC control plane signaling between them.

In another embodiment of the present disclosure, when the UE sends a measurement report to S-eNB, the UE receives a response indicating that a second cell (T-eNB) is a suitable cell and for subsequent transactions and the UE could setup a new connection with the T-eNB. Thus, the UE knows that it can request a service from a new suitable cell apart from the S-eNB. In such a case, the UE sends a service request message to the MME via the S-eNB. Upon receiving the service message request, the Mobility Management Entity (MME) establishes resources with the new target eNB and indicates the S-eNB to send a partial handover command to the UE. The above embodiment of the present disclosure is applicable for the scenario where the eNB-2 (T-eNB) have direct S1-MME interface with the MME.

In yet another embodiment of the present disclosure, the UE, based on prior policy (ANDSF or APN configuration) resident at the UE for certain services, requests the MME to setup an EPS bearer via the new eNB rather than the serving eNB (Dual connectivity). The MME then sets up the resources with the T-eNB/SGW and responds to the UE service request via the new eNB. The above embodiment of the present disclosure is applicable for the scenario where the eNB-2 (T-eNB) have direct S1-MME interface with the MME.

Currently in the Mobility Management Entity (MME) behavior, if there is an additional eNB connection request from the UE and when there is already an existing connection from another eNB, the Mobility Management Entity (MME) considers this as a "Cloned SIM" or the UE lost connection in the previous eNB. In order to allow for dual connectivity between eNBs in an Long Term Evolution (LTE) network, in the present disclosure, the Mobility Management Entity (MME) initiates and establishes dual connectivity for simultaneous data transmission and reception for a UE via two or more eNBs establishing one or more EPS bearers per eNB simultaneously either in a shared or a non-shared (different eNBs broadcasting different PLMN IDs) network configuration scenario in an LTE network.

In some embodiments of the present disclosure, the UE includes dual connectivity indicator in the Non-Access Stratum (NAS) message as to indicate to the MME that the request is for dual connectivity and to simultaneously maintain the previous contexts and connections. The MME authorizes the dual connectivity based on the UE capability and subscription. Alternatively, the MME authorizes the dual connectivity based on the network capability to support dual connectivity and partial offloading/handover.

Upon receiving the dual connectivity request, the MME decides on the multi ERAB PDN connections and derives cryptographically unique keys for the eNB-2. In some embodiments of the present disclosure, the MME and UE derive two separate AS (eNB) security context Keys and values for each eNB (i.e., a Key KeNB, a Next Hop value, and the like). For example, from KSAME, two AS security context related keys and values are derived for each eNB by the MME and the UE. When the eNB-1 is serving the UE, the UE has one Non-access Stratum (NAS) connection with the MME through one of the eNBs. Further, the MME activates EPS bearers with different eNBs.

In some embodiments of the present disclosure, the MME and the UE derives two separate eNB security context related keys and values for each eNB. For example, from KSAME value, the first KeNB is derived and the Next Hop value (NH) parameter is used for the second KeNB derivation by the MME. In this case, the MME and the UE maintain single NH value chain for both eNBs (AS security context parameter).

In some embodiments of the present disclosure, the MME and the UE derives two separate KeNB security contexts for each eNB using the EPS Bearer Identity as one of the input parameter for unique KeNB key derivation. In this case, the MME and the UE derive separate AS security related parameters for each eNBs.

In some embodiments of the present disclosure, the MME and the UE exchange Nonce to derive two separate eNB security contexts for each eNB. In one exemplary implementation, the MME and the UE use the uplink NAS COUNT values to derive two separate AS security related parameters for each eNB. For example, the MME and the UE use the NAS COUNT of the NAS message which triggers the MME to establish simultaneous EPS bearer with different eNBs. The NAS message is being a Service Request Message. Alternatively, the NAS message is an Attach Request message. In another exemplary implementation, the MME and the UE use the downlink NAS COUNT values to derive two separate AS security related parameters for each eNB. For example, the MME and the UE use the NAS COUNT of the NAS message which confirms dual connectivity to the UE to establish simultaneous EPS bearer with different eNBs.

In some embodiments of the present disclosure, each eNB does the AS SMC procedure with the UE separately for establishing the AS security context independently.

In some embodiments of the present disclosure, the MME derives and maintains the simultaneous AS context related parameters which are active in different eNBs simultaneously.

In some embodiments of the present disclosure, the MME generates a new eNB Key set Identifier (KSIASME-eNB) for each AS security context as to identify the AS security related parameters derived for a particular eNB along with eKSI (Key Set Identifier in E-UTRAN). For example, during UE transitions to RRC-Idle Mode, the eNB indicates the KSIASME-eNB to the MME to remove the stored AS security context details (eNB and NH value). In one embodiment of the present disclosure, the MME indicates the generated new eNB Key set Identifier (KSIASME-eNB) to the eNB through S1 application protocol (S1-AP) procedure. For example, the S1 application protocol (S1-AP) procedure is an INITIAL CONTEXT SETUP. Further, the eNB indicates the KSIASME-eNB to the UE when performing AS Security Mode Command procedure. In another embodiment of the present disclosure, the MME indicates the generated new eNB Key set Identifier (KSIASME-eNB) to the UE through NAS SMC procedure.

The AS security context related parameters include the Key KeNB, NH Value and Next hop Chaining Counter (NCC). In one embodiment of the present disclosure, the MME will initiate rekeying of the KeNB to the eNBs where the UE is currently attached with. In another embodiment of the present disclosure, the MME and the UE perform separate EPS AKA procedure and derive new KASME for each EPS bearer from different eNBs. Further, the MME maintains simultaneous multiple EPS Key hierarchy for the bearer connection from different eNBs.

The MME and the UE use the NAS security context derived when establishing the EPS bearer through the Macro or master eNB. However, the MME and the UE use the KASME derived through small or Pico eNB for derivation of AS security context of small or Pico eNB.

The MME sends a handover request containing the cryptographically unique key (KeNB) to the eNB-2. The eNB-2 sends an acknowledgement message in response to the handover request. Once the acknowledgement is received, the MME sends a partial offloading/Handover command to the eNB-1. In one embodiment of the present disclosure, the partial offloading/Handover command includes an indication for dual connectivity. Accordingly, the eNB-1 issues a partial handover command to the UE. The UE derives the cryptographically unique keys for the eNB-2 based on the partial handover command and establishes a connection with the eNB-2. It can be noted that, the UE may have a RRC connection with each eNB and one NAS connection with the MME.

Figure 3:
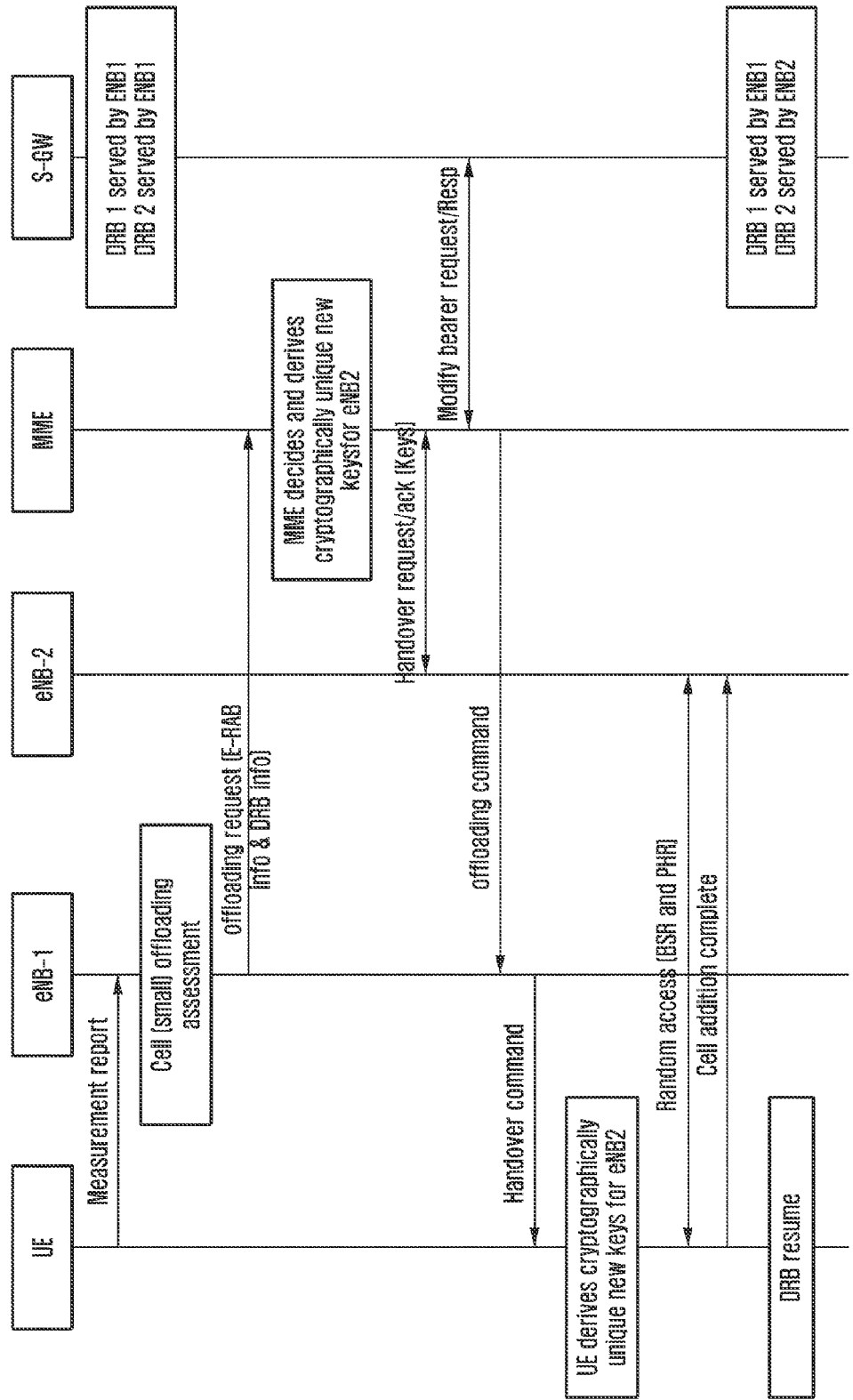
FIG. 3 illustrates a sequence diagram illustrating a method of simultaneous transmission and reception between a UE and multiple eNBs according to an embodiment of the present disclosure.

FIG. 3 illustrates a sequence diagram illustrating a method of simultaneous transmission and reception between a UE and multiple eNBs according to an embodiment of the present disclosure.

Referring to FIG. 3, the UE has an RRC control plane signaling connection with each eNB and also eNBs have S1-MME interface. After the eNB-2 is added into the "active set" maintained between the respective eNB and the MME, the eNB-1 does not care about the eNB-2 context. In the present disclosure, the eNBs provide preference for offloading/addition of other eNBs based on the measurement reports received from the UEs, an eNB load, Radio Resource Management (RRM), and the like. The MME may decide on a final active set for each UE based on subscription, service, Quality of Service (QoS) or any other consideration.

It can be noted that, no X2 dependency assumption between eNBs is made for dual connectivity, if eNB-2 (T-eNB) has direct S1-MME interface with the MME and also the UE and the eNB-2 (T-eNB) has direct RRC control plane signaling connection between them. If anyone or both the S1-MME (between the eNB and the MME) is not possible/available and the RRC control plane signaling (between the eNB and the UE) is not possible/available, then the X2 interface between the eNBs is assumed. The present disclosure discloses partial handover mechanism for specific ERABs offloading. The eNB-1 is not involved in transactions between the eNB-2 and the UE, once the UP ERAB is established. Further, if the eNB-1 signal drops, the eNB-1 requests for a handover to the best cell.

In LTE, the handover using the X2 interface is also permitted. The procedure is used to handover a UE from an S-eNB to a T-eNB using the X2 interface when the Mobility Management Entity (MME) and SGW are unchanged. The X2 handover procedure is performed without Evolved Packet Core (EPC) involvement, i.e., preparation messages are directly exchanged between the S-eNB and T-eNB. The release of the resources at the S-eNB during the handover completion phase is triggered by the T-eNB. However if there is no S1-MME interface is available, then a method to perform offloading by the S-eNB (which has S1-MME interface) is needed.

Figure 4:
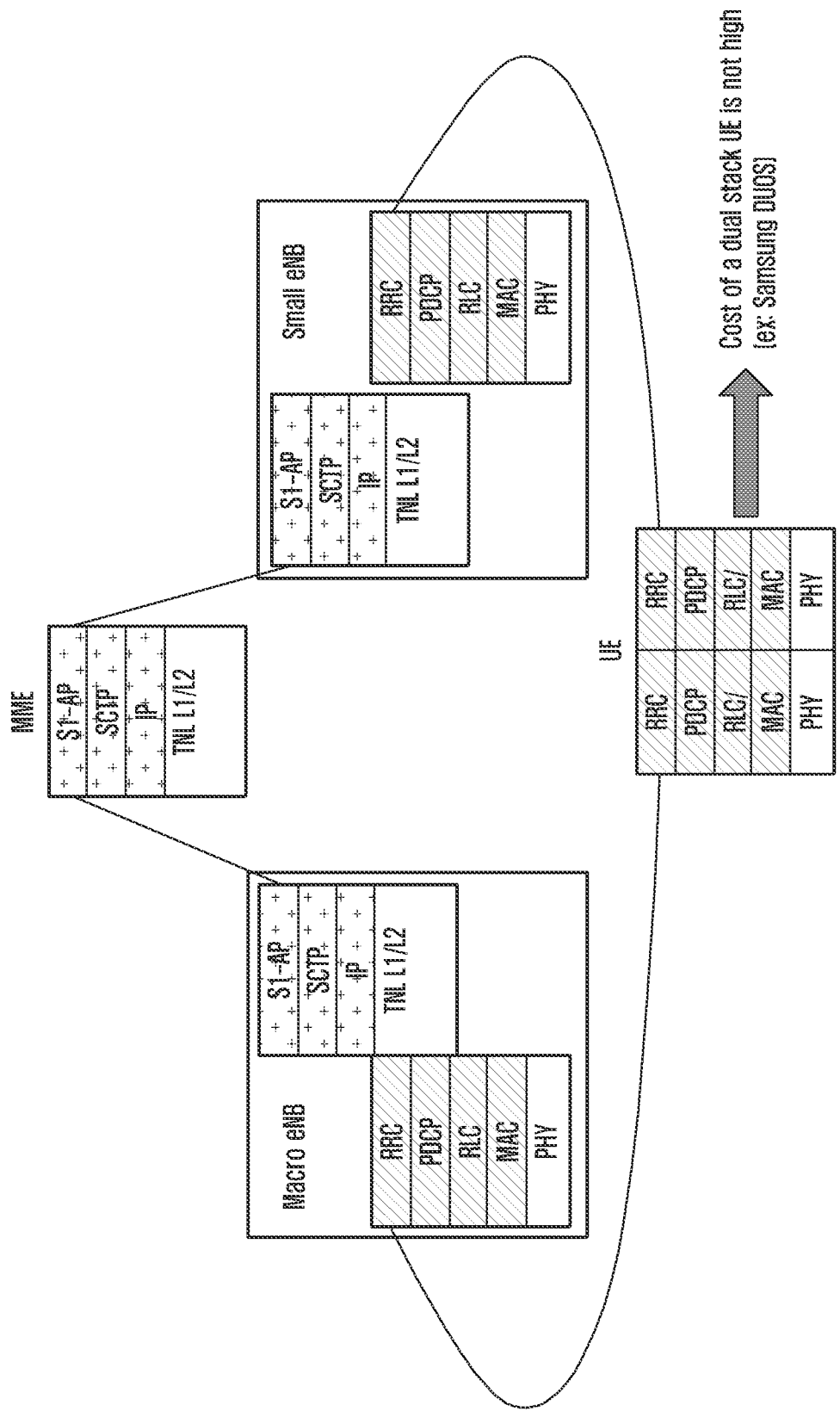
FIG. 4 illustrates a schematic diagram illustrating a protocol stack level architecture according to an embodiment of the present disclosure.
Figure 5:
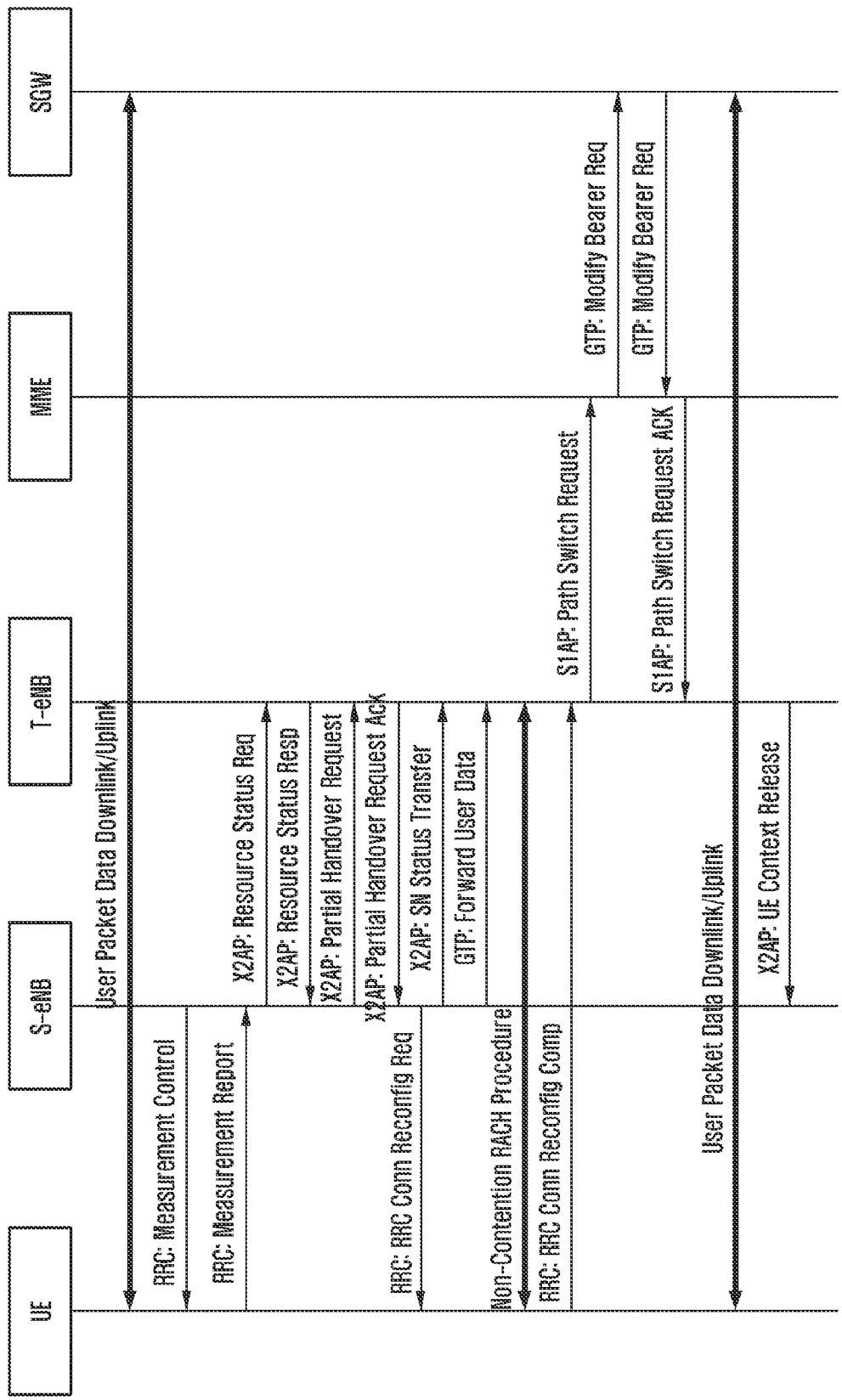
FIG. 5 illustrates a sequence diagram illustrating a method of performing partial handover using an X2 handover procedure according to an embodiment of the present disclosure.

FIG. 4 illustrates a schematic diagram illustrating a protocol stack level architecture according to an embodiment of the present disclosure. FIG. 5 illustrates a sequence diagram illustrating a method of performing partial handover using an X2 handover procedure according to an embodiment of the present disclosure.

Referring to FIG. 4, the UE has the RRC control plane signaling connection with each eNBs and also eNBs have S1-MME interface with the MME.

In one embodiment of the present disclosure, a method of partial handover is implemented via the X2 handover procedure. In this embodiment of the present disclosure, a method for adding dual connectivity via the X2 handover procedure is implemented.

Referring to FIG. 5, when the S-eNB decides to handover, a subset of the existing or newly requested ERABs to a T-eNB, the S-eNB directs the UE to establish a new RRC connection with the T-eNB for the specific ERAB. The S-eNB initiates an X2AP partial handover request with a T-eNB indicating that this is a dual connectivity and derives a new key KeNB (AS security context parameters) for the UE. The details for deriving the new keys and the bearer configuration are provided by the S-eNB to the UE in the RRC message. The RRC message can be a modified RRC reconfiguration message. Alternatively, the RRC message can be the modified Handover Command Message for partial handover providing the parameters for new key derivation and bearer configuration to use in the target cell for the specified ERABs.

During a partial handover procedure, when the T-eNB and the UE already has the UE context for a specific bearer, the T-eNB and the UE can reuse the existing context rather than setup a new context received from the S-eNB.

When the T-eNB sends an S1AP path switch request, the T-eNB shall indicate to the MME that the path switch is a partial path switch (i.e., dual connectivity) and applicable to the listed ERABs/EPS Bearer IDs. The MME then establishes a new S1AP context for the T-eNB and the data path is established.

Figure 6:
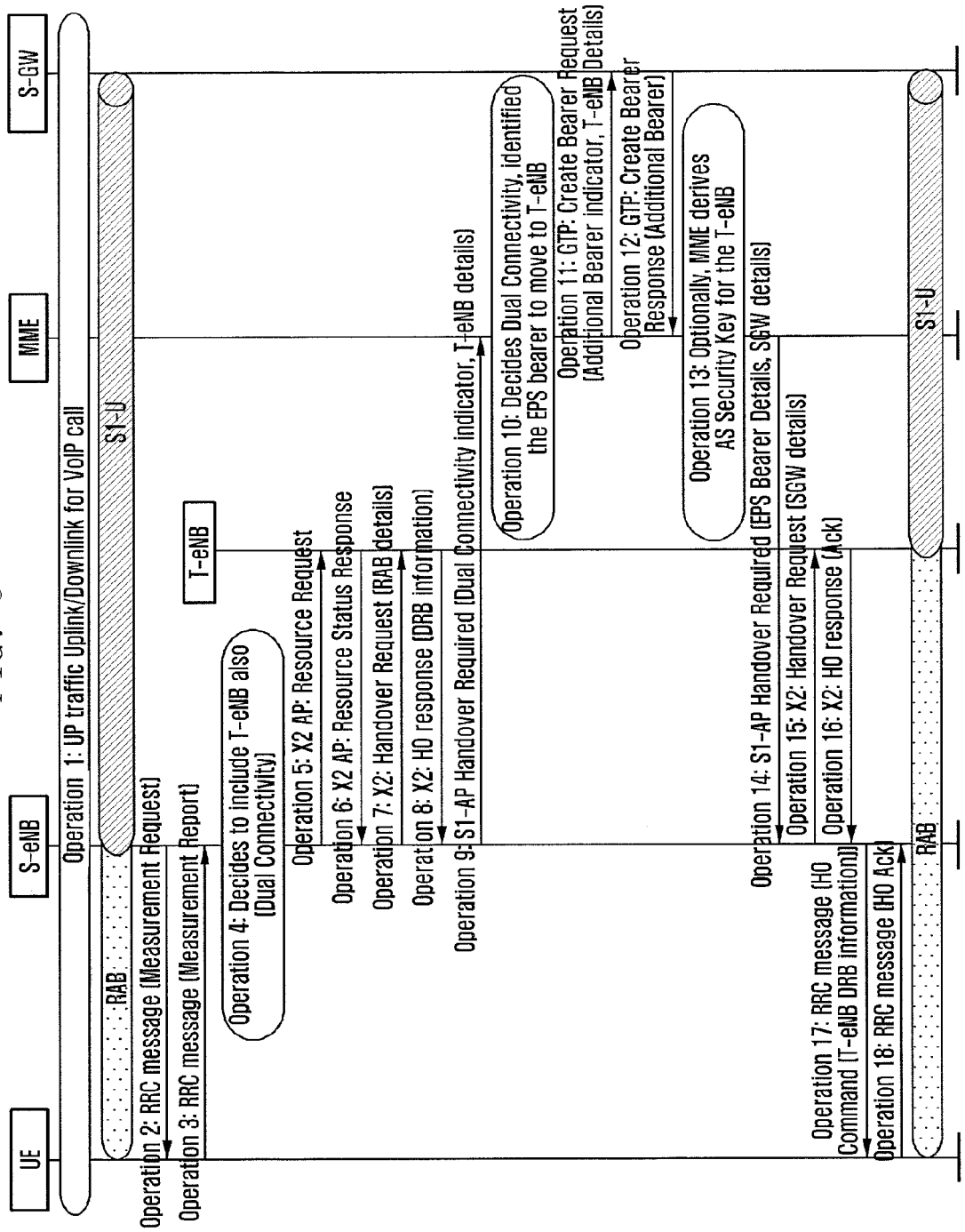
FIG. 6 illustrates a flow diagram illustrating a handover based method of simultaneous transmission and reception between a UE and multiple eNBs according to an embodiment of the present disclosure.

FIG. 6 illustrates a flow diagram illustrating a handover based method of simultaneous transmission and reception between a UE and multiple eNBs according to an embodiment of the present disclosure.

Referring to FIG. 6, a Long Term Evolution (LTE) system capable of providing simultaneous transmission and reception between multiple eNBs and the UE, where the T-eNB does not have S1-MME interface with the MME and also the UE does not have RRC control plane signaling with the T-eNB is described below. Further to embodiment explained below, the S-eNB (is the Master or anchor eNB) is the eNB which hosts the RRC layer, terminates S1-MME and therefore acts as mobility anchor towards the Core Network (CN). The T-eNB (is the secondary or assisting eNB) is an eNB providing additional radio resources for the UE. The sequence of operations provided below is according to one embodiment and variations in the sequence are within the ambient of the present disclosure.

At operation 1, the UE performs attach procedure through the S-eNB (Serving eNB) and network establish EPS bearer (PDN connection) for an APN (for example: VoIP call) based on the UE request. In addition to this ongoing service, the UE request for another PDN connection for another APN (for example: File Downloading). The network establishes another EPS bearer (PDN connection) for another APN File Downloading. The above procedures are performed as described in 3GPP TS 23.401 specification.

At operation 2, the eNB may send RRC message (for example, Measurement Request) to the UE to perform measurement.

At operation 3, based on the request from S-eNB, or due to measurement report triggering, the UE sends measurement reports to the S-eNB in RRC message (for example, Measurement report).

At operation 4, based on the measurement report received by the S-eNB, the S-eNB performs cell offloading assessment to determine whether to add another eNB (T-eNB). If the S-eNB decides to add another eNB (hereinafter T-eNB), the following operations are performed. In the present disclosure, eNBs provide preference for offloading/addition of other eNBs based on the measurement reports received from the UEs and its load and small cell load as part of RRM.

At operation 5, the S-eNB optionally sends X2-AP message to the T-eNB (for example, Resource Request message), to determine for the availability of the resources in T-eNB and to move certain EPS bearer (for example, File Download PDN Connection hereafter EPS Bearer-2) to the T-eNB. The S-eNB may include any of the following information in the request message: PDN connection's Radio Bearer information, Requested QoS values, allocated QoS values, UE identity information, RRM information. Alternatively, the S-eNB includes any of the above parameter in a new (Dual connectivity) X2-AP message.

At operation 6, the T-eNB sends a RRC response message, providing its current status of the resources.

At operation 7, the S-eNB sends X2-AP Handover Request message (Part-1) to the T-eNB to move the certain EPS bearer (for example, EPS Bearer-2) to the T-eNB. In an embodiment of the present disclosure, it may be the S-eNB may include any of the following information in the request message: E-UTRAN Cell Global Identifier (ECGI) of the Target Cell (of T-eNB), UE-Aggregate maximum bit rate (AMBR), UE Security Capability, AS security context of the UE (which includes key KeNB*), EUTRAN Radio Access Bearer (E-RAB) to be setup (E-RAB ID, QoS Class Identifier (QCI), Allocation and Retention Priority (ARP), S1 S-GW TEID). In an embodiment of the present disclosure, the X2-AP message can be secondary cell command for T-eNB addition.

At operation 8, the T-eNB performs admission control upon receipt of the Handover Request from the S-eNB. In yet another embodiment of the present disclosure, based on the request from S-eNB for dual connectivity, the T-eNB creates DL S1-U TEID and includes in the X2-AP message response message. The T-eNB responds with X2AP Handover Request Acknowledge (Part-1). The T-eNB may include any of the following information in the (part-1) request message: Information about the accepted RABs, the Uplink and Downlink General Packet Radio Service (GPRS) Tunneling Protocol (GTP) Tunnel information is included and a Handover Command message sent via a transparent container. Handover Command (T-eNB allocated C-RNTI, T-eNB assigned DRB ID (UL/DL), T-eNB AS Security Algorithm) and E-RAB to be switched in DL (E-RAB ID, S1 Target eNB TEID). In an embodiment of the present disclosure, the X2-AP message can be secondary cell command acknowledge for T-eNB addition, instead of Handover Command.

In an embodiment of the present disclosure, for dual connectivity, the X2 interface is used to carry the S1-U tunnel parameters for S1-U bearer establishment between the T-eNB and the S-GW, through the S-eNB. The T-eNB creates DL S1-U TEID and includes it in the X2-AP message, so the S-GW gets S1-U TE-ID of the T-eNB and establishes the Downlink (DL) S1-U bearer with the T-eNB.

At operation 9, based on the received RRC response message (Handover Request Acknowledge (Part-1)), the S-eNB can make a decision to handover/offload the EPS Bearer-2 to the T-eNB. If the S-eNB decides to perform offloading/partial handover (Inter-eNB Carrier aggregation) of EPS Bearer-2, the S-eNB sends an S1-AP Handover message (offloading) to a Mobility Management Entity (MME). The S1-AP Handover message may include any of the following parameters: Direct Forwarding Path Availability, Source to Target transparent container received from the T-eNB (Handover Command (T-eNB allocated C-RNTI, T-eNB assigned DRB ID (UL/DL), T-eNB AS Security Algorithm)), T-eNB Identity, CSG ID, CSG access mode, S-eNB TAI, S1AP Cause, received E-RAB to be switched in DL (E-RAB ID, S1Target eNB TEID), T-eNB's ECGI. The S1AP Cause indicates that it is dual connectivity and the MME needs to establish dual connectivity with the T-eNB. In another words, S1AP Cause indicates that the T-eNB is an additional eNB that will be serving the UE along with the current serving S-eNB. In an embodiment of the present disclosure, the indication that the S1-AP request message is for dual connectivity can be indicated using a new parameter and it is included in the S1-AP request message.

Optionally, instead of S1-AP Handover message, the S-eNB sends an S1-AP Path Switch Request message on behalf of the T-eNB to the Mobility Management Entity (MME). The S1-AP Path Switch Request message may include any of the following parameters: Direct Forwarding Path Availability, T-eNB allocated C-RNTI, T-eNB assigned DRB ID (UL/DL), T-eNB AS Security Algorithm, T-eNB Identity, CSG ID, CSG access mode, S-eNB TAI, S1AP Cause, received E-RAB to be switched in DL (E-RAB ID), S1 Target eNB TEID, T-eNB's ECGI. The S1AP Cause (for example, Radio Network Layer Cause "Dual Connectivity") indicates that it is dual connectivity and the MME needs to establish dual connectivity with the T-eNB. In another words, S1AP Cause indicates that the T-eNB is an additional eNB that will be serving the UE along with the current serving S-eNB. In an embodiment of the present disclosure, the indication that the S1-AP request message is for dual connectivity can be indicated using a new parameter and it is included in the S1-AP request message.

The S-eNB performs the bearer establishment functions along with the MME. The S-eNB when preparing the T-eNB, it obtains the parameters for the S1-U bearer/tunnel set-up from the T-eNB using X2 interface and sends the obtained parameters to the MME using S1-MME interface, so that S-GW establish the Downlink (DL) S1-U bearer with the T-eNB.

In an embodiment of the present disclosure, S-eNB performs the bearer path switch to T-eNB after all RRC procedure related to dual connectivity is successful. For example, operation 9 to operation 14 are performed after operation 18.

At operation 10, the MME may decide on a final active set for each UE based on subscription, service, Quality of Service (QoS) or any other consideration. The MME initiates and establishes dual connectivity for simultaneous data transmission and reception for a UE via two or more eNBs establishing one or more EPS bearers per eNB simultaneously. The MME authorizes the dual connectivity based on the UE capability and subscription. Alternatively, the MME authorizes the dual connectivity based on the network capability to support dual connectivity and partial offloading/handover. In some embodiments of the present disclosure, the UE includes dual connectivity capability indicator in the NAS message as to indicate to the MME that the UE is capable of dual connectivity and to simultaneously maintain the previous contexts and connections.

At operation 11, the MME sends a GTP-C: Modify Bearer Request to the S-GW to switch the path to the T-eNB. The Modify Bearer Request may include any of the following parameters: T-eNB address, TEID allocated at the T-eNB for downlink traffic on S1-U interface for the accepted EPS bearer(s), T-eNB ECGI, TAI (broadcasted by the MeNB).

At operation 12, SGW updates the bearer and responds back with GTP-C: Modify Bearer Response message. The Modify Bearer Request may include any of the following parameters: EPS Bearer ID. The DL S1 Bearer between the SGW and the T-eNB is established in this operation. The SGW starts sending DL packets of the EPS Bearer-2 to the T-eNB.

At operation 13, the MME optionally derives AS security keys for the T-eNB.

At operation 14, the MME sends a Handover Command (optionally Target to Source transparent container, Bearers subject to forwarding (EPS Bearer-2)) message to the S-eNB. The Bearers subject to forwarding includes list of addresses and TEIDs allocated for forwarding.

Optionally, if the MME received Path Switch message from the S-eNB, then MME sends Path Switch Request Ack message to the S-eNB. Path Switch Request Ack message may include any of the following parameter and other possible parameters: the E-RAB to be switched in UL (E-RAB ID), Target to Source transparent container (EPC part and RAN part), Bearers subject to forwarding (EPS Bearer-2).

At operation 15, optionally, the S-eNB sends X2-AP Handover Request message (Part-2) to the T-eNB to move the certain EPS bearer (File Download PDN Connection hereafter EPS Bearer-2) to the T-eNB, if it is not done at operation 7. The S-eNB may include any of the following information in the request message: Bearers to Setup includes Serving GW address and uplink TEID for a user plane, and EPS Bearer QoS. In an embodiment of the present disclosure, the X2-AP message can be SN status transfer message and the parameters related to the S1-U are included in this message. In an embodiment of the present disclosure, the X2-AP message can be a new message to carry the parameters related to the S1-U for the T-eNB to establish the S1-U between the S-GW and the T-eNB.

At operation 16, optionally, if the T-eNB receive the operation 15 message, then the T-eNB performs admission control upon receipt of the Handover Request from the S-eNB. The T-eNB responds with X2AP Handover Request Acknowledge Part-2. The T-eNB may include any of the following information in the part-1 request message: Information about the accepted RABs, the Uplink and Downlink GTP Tunnel information is included and Handover Command message sent via a transparent container.

At operation 17, optionally, the S-eNB combines the HO command received from the MME, from the T-eNB, if received Handover Command EPC part from the MME and send it to the UE through RRC message (for example, RRC reconfiguration message). If the S-eNB receives the information related to RAN part from the T-eNB (from operation 8 and/or operation 16), then the S-eNB sends the RRC message (for example, RRC reconfiguration message) to the UE. The RRC message (for example, RRC reconfiguration message) to the UE includes the RAN related information of the T-eNB to the UE.

At operation 18, the UE response back to the S-eNB Handover Confirm (RRC Connection Reconfiguration Complete). Thereafter, the UE performs random access to acquire uplink timing and resource from the T-eNB. Thus, the UE and the S-GW establish EPS Bearer-2 through T-eNB.

Figure 7:
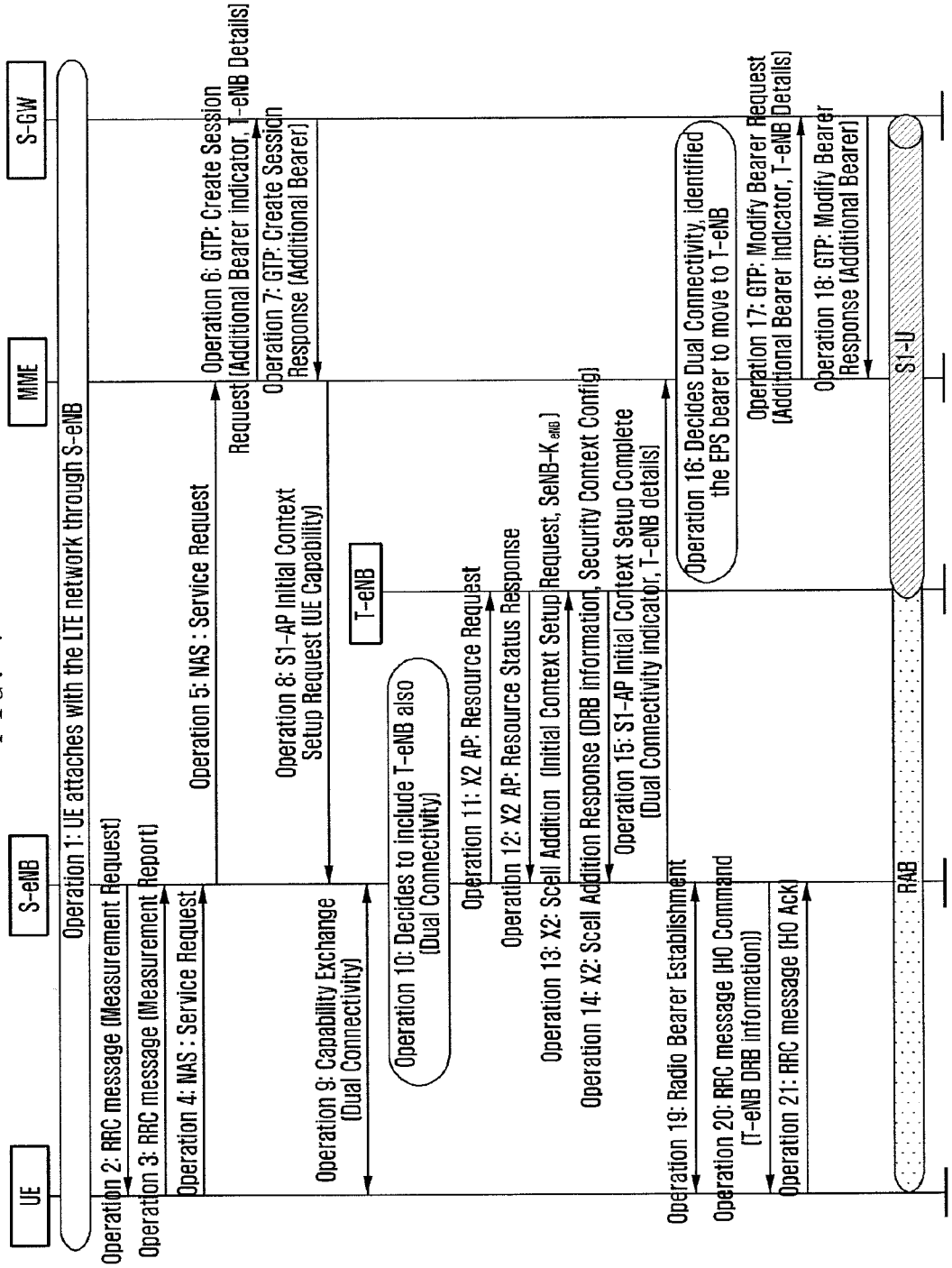
FIG. 7 illustrates a flow diagram illustrating a UE initiated service request method of simultaneous transmission and reception between a UE and multiple eNBs according to an embodiment of the present disclosure.

FIG. 7 illustrates a flow diagram illustrating a UE initiated service request method of simultaneous transmission and reception between a UE and multiple eNBs according to an embodiment of the present disclosure.

Referring to FIG. 7, a Long Term Evolution (LTE) system capable of providing simultaneous transmission and reception between multiple eNBs and the UE, where the T-eNB does not have S1-MME interface with the MME and also the UE does not have RRC control plane signaling with the T-eNB is described below. Further to the embodiment explained below, the S-eNB (is the master or anchor eNB) is the eNB which hosts the RRC layer, terminates S1-MME and therefore acts as mobility anchor towards the core network (CN). The T-eNB (is the small or secondary or assisting eNB) is an eNB providing additional radio resources for the UE. The sequence of operations provided below is according to one embodiment and variations in the sequence are within the ambient of the present disclosure.

At operation 1, the UE performs attach procedure through the S-eNB (Serving eNB) and network establishes default EPS bearer (PDN connection) based on the UE request. The above procedures are performed as described in 3GPP TS 23.401. In an embodiment of the present disclosure, the UE indicates the support for dual connectivity to the MME, during UE capability exchange procedure (for example, UE-RadioAccessCapabilityInfo, and the like). Dual connectivity capability refers to simultaneous user plane connection to the macro and small cells (for example, pico cells, and small cells).

At operation 2, the eNB may send RRC message (for example, Measurement Request) to the UE to perform measurement.

At operation 3, based on the request from S-eNB, or due to measurement report triggering, the UE sends the measurement reports to the S-eNB in RRC message (for example, Measurement report).

At operation 4, the UE requests for a service and sends NAS message: Service Request Message to the MME through the S-eNB. The UE sends NAS message Service Request towards the MME encapsulated in an RRC message to the S-eNB.

At operation 5, the S-eNB forwards NAS message to the MME. NAS message is encapsulated in an S1-AP: Initial UE Message may include any of the following parameters: NAS message (Service request), TAI+ECGI of the serving cell (S-eNB), S-TMSI, CSG ID, CSG access Mode.

At operation 6, the MME selects appropriate S-GW and sends GTP: Create Session Request message to the S-GW. The GTP: Create Session Request message may include any of the following parameters: IMSI, MSISDN, MME TEID for control plane, PDN GW address, PDN Address, APN, RAT type, Default EPS Bearer QoS, PDN Type, APN-AMBR, EPS Bearer Identity, Protocol Configuration Options, Handover Indication, ME Identity (IMEISV), User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8, Serving Network, Dual connectivity capability support of the UE.

At operation 7, the S-GW creates a new entry in its EPS Bearer table and sends a Create Session Request to the P-GW. The P-GW creates a new entry in its EPS bearer context table and returns a Create Session Response. Thereafter, S-GW returns a GTP-C: Create Session Response message to the MME. The Create Session Response may include any of the following parameters: PDN Type, PDN Address, Serving GW address for a User Plane, Serving GW TEID for S1-U User Plane, Serving GW TEID for control plane, EPS Bearer Identity, EPS Bearer QoS, PDN GW addresses and TEIDs (GTP-based S5/S8) or GRE keys (PMIP-based S5/S8) at the PDN GW(s) for uplink traffic, Protocol Configuration Options, Prohibit Payload Compression, APN Restriction, Cause, MS Info Change Reporting Action (Start), CSG Information Reporting Action (Start), APN-AMBR.

At operation 8, the MME sends S1-AP Initial Context Setup Request message to the S-eNB. The S1-AP Initial Context Setup Request message may include any of the following parameters: Serving GW address, S1-TEID(s) (UL), EPS Bearer QoS(s), Security Context, MME Signaling Connection Id, Handover Restriction List, CSG Membership Indication. The MME may decide to provide Dual Connectivity to the service request based on at least one of the UE capability, S-eNB load condition, request service, and QoS requirements. Thereafter, the MME includes the UE capability (which includes UE support for dual connectivity) and further may include MME indication to the S-eNB to determine for possible small/pico cell inclusion in the S1-AP Initial Context Setup Request message.

At operation 9, optionally, the eNB queries the UE for dual connectivity capability, if the MME does not include the UEs Dual connectivity capability in operation 8 or if the D-eNB needs to probe by itself. Dual connectivity capability refers to simultaneous user plane connection to the macro and small cells (for example, pico cells). The eNB sends RRC request message to the UE, which includes parameter to indicate that eNB needs UE supported Dual connectivity capability information. In an embodiment of the present disclosure, the RRC request message being UECapabilityEnquiry message which includes for example the Inter System PDN handling Capability parameter.

The UE sends a response message indicating Dual capability to the eNB. The UE sends RRC response message to the eNB including the UE supported Dual connectivity capability. In an embodiment of the present disclosure, the RRC response message being UECapabilityInformation message.

At operation 10, based on the measurement report received by the S-eNB and/or bade on RRM processes, the S-eNB performs cell offloading assessment to determine whether to add another eNB (T-eNB). Optionally, the eNB may perform operation 2 and receives the measurement report from the UE as mentioned in operation 3. If the S-eNB decides to add another eNB (hereinafter T-eNB), the following operations are performed. In the present disclosure, eNBs provide preference for offloading/addition of other eNBs based on at least one of the following: measurement reports received from the UEs, MME indication to perform dual connectivity, obtained UE capability, RRM processes and its load and small cell load, and the like.

At operation 11, the S-eNB optionally sends X2-AP message to the T-eNB (for example, Resource Request message), to determine for the availability of the resources in T-eNB and to move the certain EPS bearer (for example, File Download PDN Connection hereafter EPS Bearer-2) to the T-eNB. The S-eNB may include any of the following information in the request message: PDN connection's Radio Bearer information, Requested QoS values, allocated QoS values, UE identity information, RRM information. Alternatively, the S-eNB includes any of the above parameter in a new (Dual connectivity) X2-AP message.

At operation 12, the T-eNB sends a RRC response message, providing its current status of the resources.

At operation 13, the S-eNB sends X2-AP Handover Request message to the T-eNB to move the EPS bearer (particularly E-RAB) to the T-eNB. The S-eNB may include any of the following information in the request message: E-UTRAN Cell Global Identifier (ECGI) of the Target Cell (of T-eNB), UE-Aggregate maximum bit rate (AMBR), UE Security Capability, AS security context of the UE (KeNB*), EUTRAN Radio Access Bearer (E-RAB) to be setup (E-RAB ID, QoS Class Identifier (QCI), Allocation and Retention Priority (ARP), S1 S-GW TEID), received S1-AP Initial Context Setup Request message information. In an embodiment of the present disclosure, the X2-AP message can be secondary cell command for T-eNB addition.

At operation 14, the T-eNB performs admission control upon receipt of the Handover Request from the S-eNB. In yet another embodiment of the present disclosure, based on the request from S-eNB for dual connectivity, the T-eNB creates DL S1-U TEID and includes in the X2-AP message response message. The T-eNB responds with X2AP Handover Request Acknowledge. The T-eNB may include any of the following information in the request message: Information about the accepted RABs, the Uplink and Downlink GTP Tunnel information is included, Handover Command (T-eNB allocated C-RNTI, T-eNB assigned DRB ID (UL/DL), T-eNB AS Security Algorithm) and EUTRAN Radio Access Bearer (E-RAB) to be switched in DL (E-RAB ID, S1 Target eNB TEID).

In an embodiment of the present disclosure, for dual connectivity, the X2 interface is used to carry the S1-U tunnel parameters for S1-U bearer establishment between the T-eNB and the S-GW, through the S-eNB. The T-eNB creates DL S1-U TEID and includes it in the X2-AP message, so the S-GW gets S1-U TE-ID of the T-eNB and establishes the Downlink (DL) S1-U bearer with the T-eNB.

At operation 15, based on the received RRC response message (Handover Request Acknowledge), the S-eNB can make a decision to handover/offload the EPS Bearer to the T-eNB. If the S-eNB decides to perform partial offloading (Inter-eNB Carrier aggregation) of EPS Bearer, then S-eNB sends an S1-AP Initial Context Setup complete message to a Mobility Management Entity (MME). The S1-AP Initial Context Setup complete message may include any of the following parameters: Direct Forwarding Path Availability, Source to Target transparent container received from the T-eNB (Handover Command (T-eNB allocated C-RNTI, T-eNB assigned DRB ID (UL/DL), T-eNB AS Security Algorithm)), T-eNB Identity, CSG ID, CSG access mode, target TAI, S1AP Cause, received E-RAB to be switched in DL (E-RAB ID, S1 T-eNB TEID (DL)), T-eNB's ECGI. The S1AP Cause indicates that it is dual connectivity and the MME needs to establish dual connectivity with the T-eNB. In another words, S1AP Cause indicates that the T-eNB is an additional eNB that will be serving the UE along with the current serving S-eNB.

Optionally, instead of S1-AP Initial Context Setup complete message, the S-eNB sends an S1-AP Path Switch Request message on behalf of the T-eNB to the Mobility Management Entity (MME). Alternatively, S1-AP Path Switch Request message is picky-packed with S1-AP Initial Context Setup complete message. The S1-AP Path Switch Request message may include any of the following parameters: Direct Forwarding Path Availability, Source to Target transparent container received from the T-eNB (Handover Command (T-eNB allocated C-RNTI, T-eNB assigned DRB ID (UL/DL), T-eNB AS Security Algorithm)), T-eNB Identity, CSG ID, CSG access mode, target TAI, S1AP Cause, received E-RAB to be switched in DL (E-RAB ID, S1 Target eNB TEID), T-eNB's ECGI. The S1AP Cause (for example, Radio Network Layer Cause "Dual Connectivity") indicates that it is dual connectivity and the MME needs to establish dual connectivity with the T-eNB. In another words, S1AP Cause indicates that the T-eNB is an additional eNB that will be serving the UE along with the current serving S-eNB. In an embodiment of the present disclosure, the indication that the S1-AP request message is for dual connectivity can be indicated using a new parameter and it is included in the S1-AP request message.

The S-eNB performs the bearer establishment functions along with the MME. The S-eNB when preparing the T-eNB, it obtains the parameters for the S1-U bearer/tunnel set-up from the T-eNB using X2 interface and sends the obtained parameters to the MME using S1-MME interface, so that S-GW establish the Downlink (DL) S1-U bearer with the T-eNB.

In an embodiment of the present disclosure, S-eNB performs the bearer path switch to T-eNB after all RRC procedure related to dual connectivity is successful.

At operation 16, the MME may decide on a final active set for each UE based on subscription, service, Quality of Service (QoS) or any other consideration. The MME initiates and establishes dual connectivity for simultaneous data transmission and reception for a UE via two or more eNBs establishing one or more EPS bearers per eNB simultaneously. The MME authorizes the dual connectivity based on the UE capability and subscription (if it is not performed at operation 8). Alternatively, the MME authorizes the dual connectivity based on the network capability to support dual connectivity and partial offloading/handover. In some embodiments of the present disclosure, the UE includes dual connectivity indicator in the NAS message as to indicate to the MME that the request is for dual connectivity and to simultaneously maintain the previous contexts and connections.

At operation 17, the MME sends a GTP-C: Modify Bearer Request to the S-GW to switch the path to the T-eNB. The Modify Bearer Request may include any of the following parameters: T-eNB address, TEID allocated at the T-eNB for downlink traffic on S1 U for the accepted EPS bearers, T-eNB ECGI, TAI.

At operation 18, the SGW updates the bearer and responds back with GTP-C: Modify Bearer Response message. The Modify Bearer Request may include any of the following parameters: EPS Bearer ID. The DL S1 Bearer between the SGW and the T-eNB is established in this operation. The SGW starts sending DL packets of the EPS Bearer-2 to the T-eNB.

Optionally, if the MME received Path Switch message from the S-eNB, then MME sends Path Switch Request Ack message to the S-eNB. Path Switch Request Ack message may include any of the following parameter and other possible parameters: the E-RAB to be switched in UL (E-RAB ID), Target to Source transparent container (EPC part and RAN part), Bearers subject to forwarding (EPS Bearer-2).

At operation 19, the S-eNB performs the radio bearer establishment procedure. The radio bearer establishment procedure is performed using RRC message. The RRC message exchange being: RRC Connection Reconfiguration and RRC Connection Reconfiguration Complete. RRC Connection Reconfiguration message may include any of the following configurations: measurement configuration, mobility control, radio resource configuration (including RBs, MAC main configuration and physical channel configuration) including any associated dedicated NAS information and security configuration, T-eNB radio configurations. Thereafter, the UE performs random access to acquire uplink timing and resource from the T-eNB. Thus, the user plane bearer for the service request through the T-eNB is established at this operation.

At operation 20, optionally, instead of operation 19, then S-eNB send the HO command to the UE through RRC message (for example, RRC reconfiguration message).

At operation 21, the UE response back to the S-eNB Handover Confirm (RRC Connection Reconfiguration Complete). Thereafter, the UE performs random access to acquire uplink timing and resource from the T-eNB. Thus, the UE and the S-GW establish EPS Bearer-2 through T-eNB at this operation.

Figure 8:
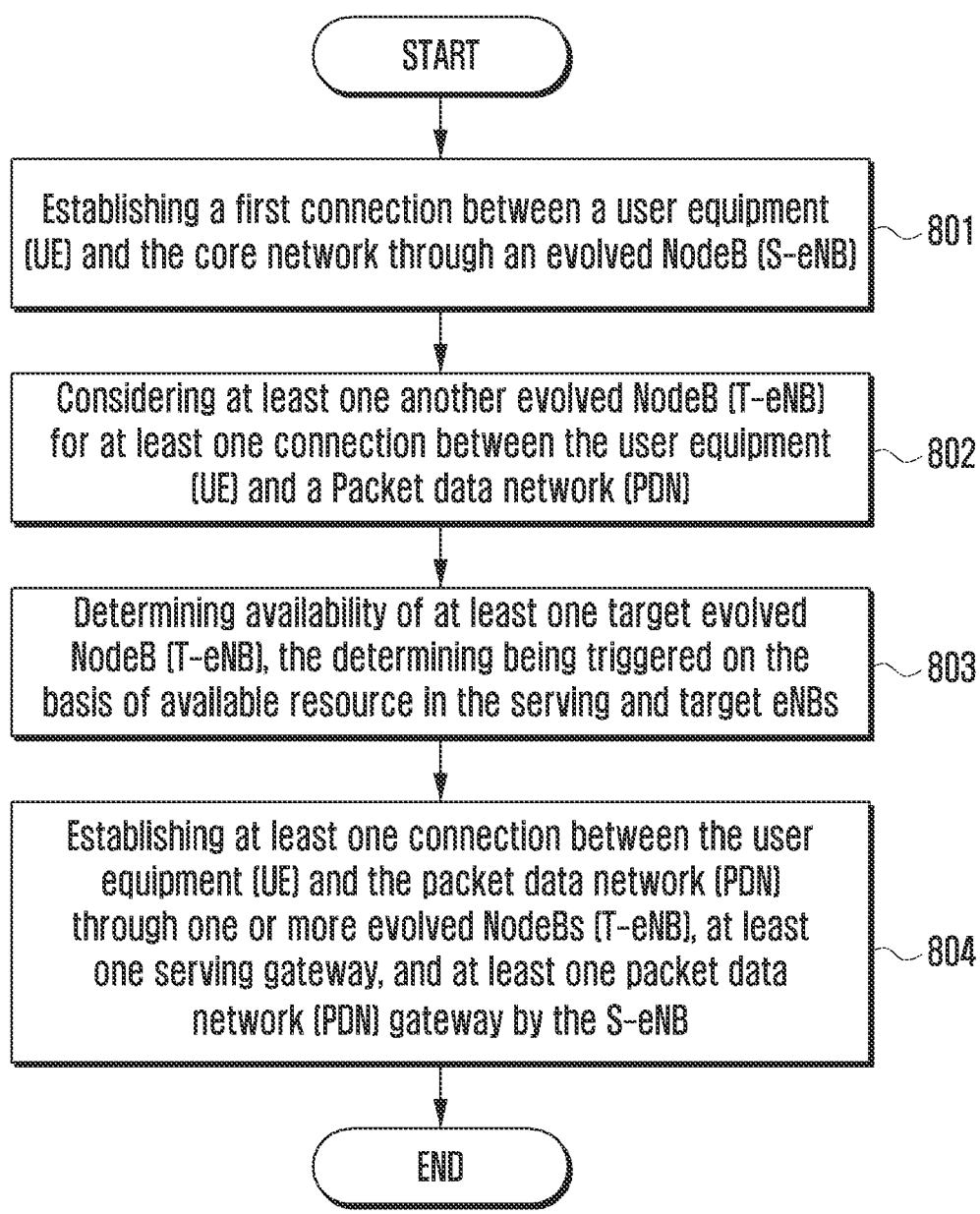
FIG. 8 illustrates a flow diagram of a method for providing simultaneous connectivity between multiple eNBs and a UE according to an embodiment of the present disclosure.

FIG. 8 illustrates a flow diagram of a method for providing simultaneous connectivity between multiple eNBs and a UE according to an embodiment of the present disclosure.

Referring to FIG. 8, a first connection is established between the UE and the core network through an S-eNB in operation 801. One or more additional T-eNBs are considered for at least one or more connections between the UE and a PDN in operation 802. Availability of at least one T-eNB is determined which is triggered based on available resource in the serving and target eNBs in operation 803. One or more connections are established between the UE and the PDN through one or more evolved NodeBs (T-eNB), at least one S-GW, and at least one PDN gateway in operation 804, by the S-eNB.

Figure 9:
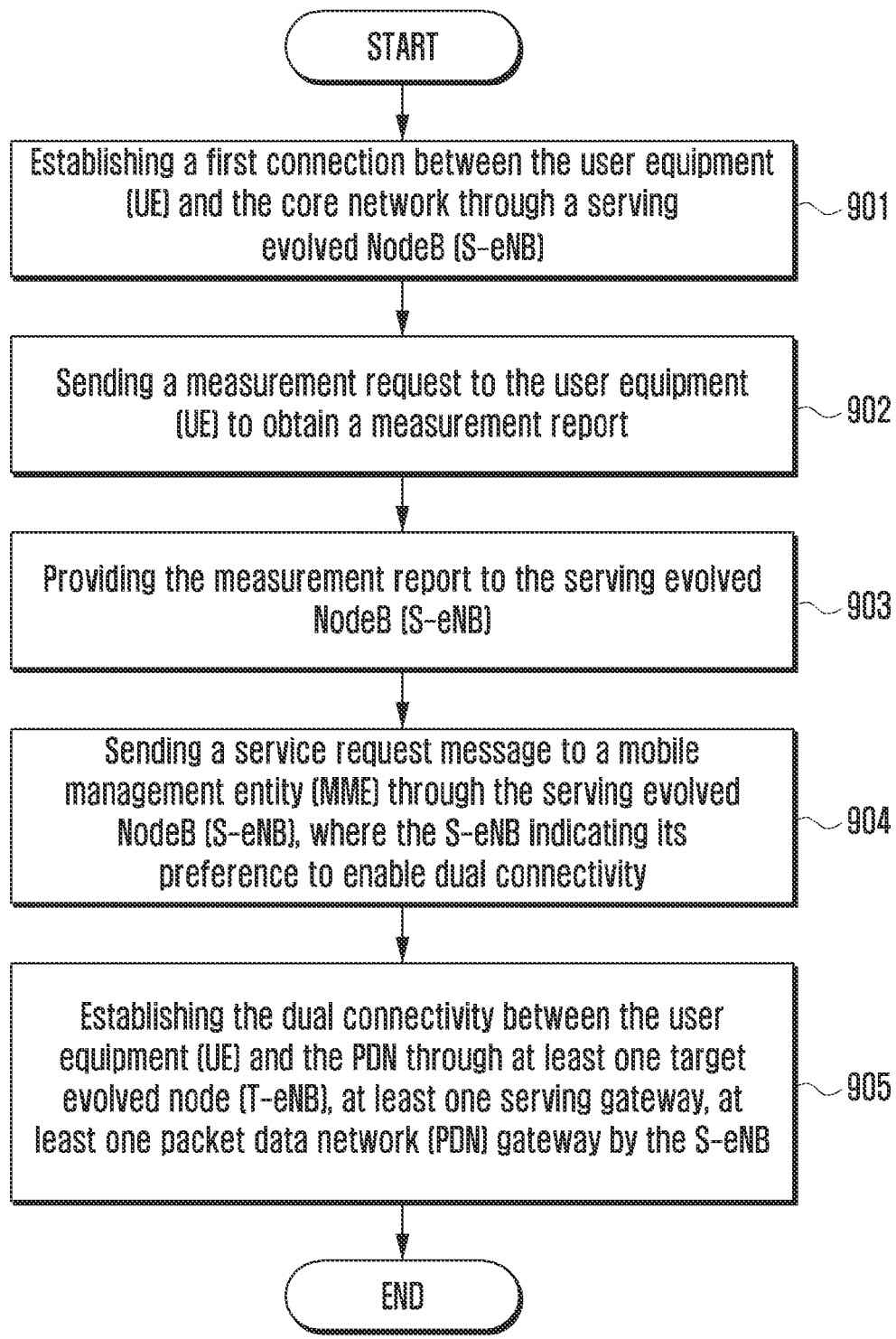
FIG. 9 illustrates a flow diagram of a method for providing simultaneous connectivity between multiple eNBs and a UE according to an embodiment of the present disclosure.

FIG. 9 illustrates a flow diagram of a method for providing simultaneous connectivity between multiple eNBs and a UE according to an embodiment of the present disclosure.

Referring to FIG. 9, a first connection is established between the UE and the core network through an S-eNB in operation 901. A measurement report request message is sent to the UE in operation 902. The measurement report is provided to the S-eNB in operation 903. A service request message is sent to a Mobility Management Entity (MME) through the serving evolved NodeB in operation 904. Dual connectivity is established between the UE and the PDN through at least one T-eNB, at least one S-GW, at least one PDN gateway in operation 905, by the S-eNB.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first base station for providing dual connectivity for a user equipment (UE) to be connected to the first base station associated with a first packet and a second base station associated with a second packet, the method comprising:
    transmitting, to the second base station, a first message including bearer information for dual connectivity configuration to support the dual connectivity for the UE to use the second base station while using the first base station;
    receiving a second message including establishment information related to a bearer in response to the first message, from the second base station; and
    transmitting, to a mobility management entity (MME), a third message including bearer transport information to transfer a bearer context from the first base station to the second base station.

2. The method of claim 1, wherein the bearer transport information includes a tunnel endpoint ID (TEID) for the bearer.

3. The method of claim 1, wherein the establishment information includes interface related information.

4. The method of claim 1,
    wherein a modification request message including the bearer transport information is transmitted from the MME to a serving gateway (S-GW), and
    wherein a modification response message is transmitted from the S-GW to the MME.

5. A first base station for providing dual connectivity for a user equipment (UE) to be connected to the first base station associated with a first packet and a second base station associated with a second packet, the first base station comprising:
    a transmitter;
    a receiver; and
    at least one processor configured to:
        transmit, to the second base station, a first message including bearer information for dual connectivity configuration to support the dual connectivity for the UE to use the second base station while using the first base station,
        receive, from the second base station, a second message including establishment information related to a bearer in response to the first message, and
        transmit, to a mobility management entity (MME), a third message including bearer transport information to transfer a bearer context from the first base station to the second base station.

6. The first base station of claim 5, wherein the bearer transport information includes a tunnel endpoint ID (TEID) for the bearer.

7. The first base station of claim 6, wherein the establishment information includes interface related information.

8. The first base station of claim 5,
    wherein a modification request message including the bearer transport information is transmitted from the MME to a serving gateway (S-GW), and
    wherein a modification response message is transmitted from the S-GW to the MME.

* * * * *